UNITED STATES PATENT OFFICE.

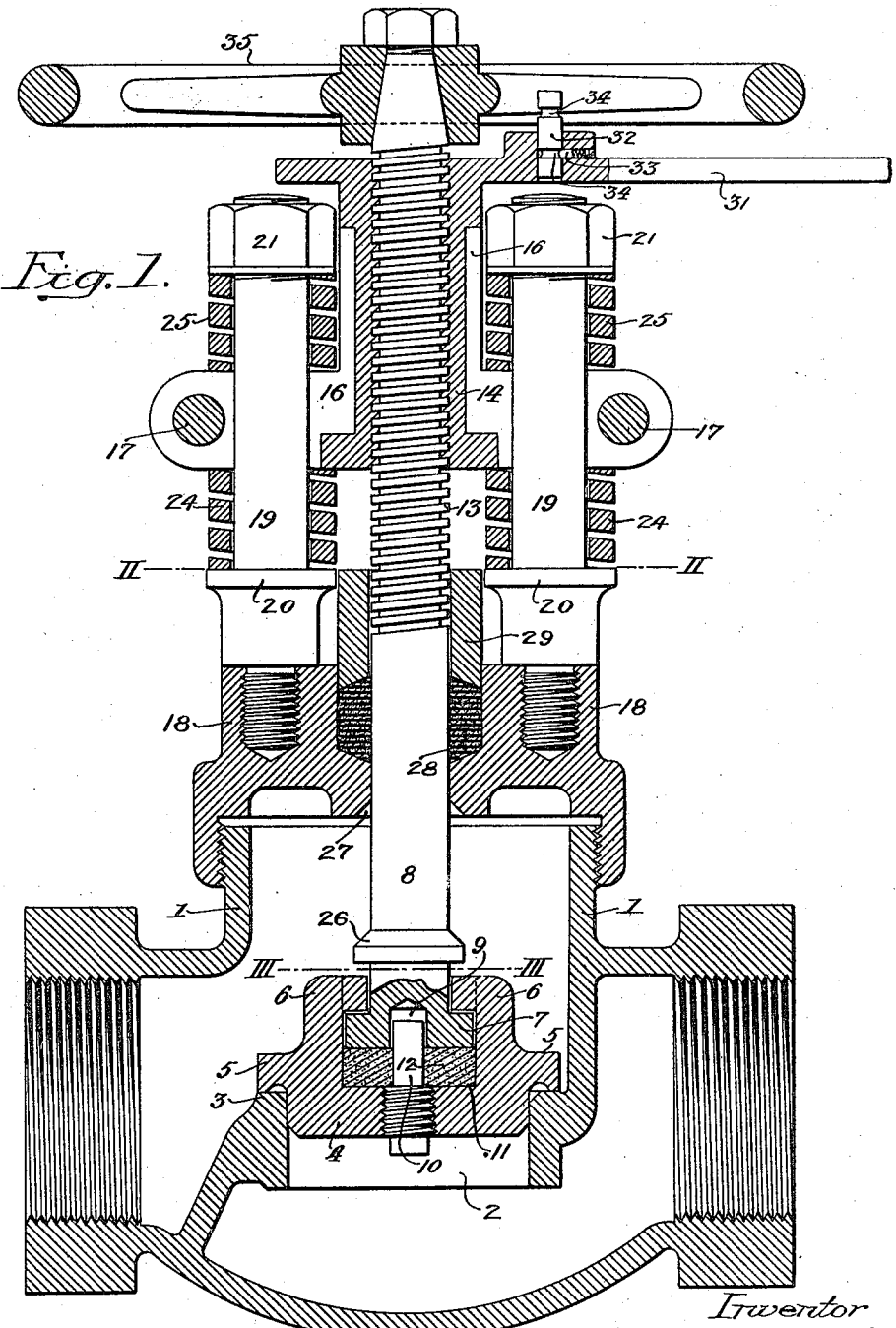

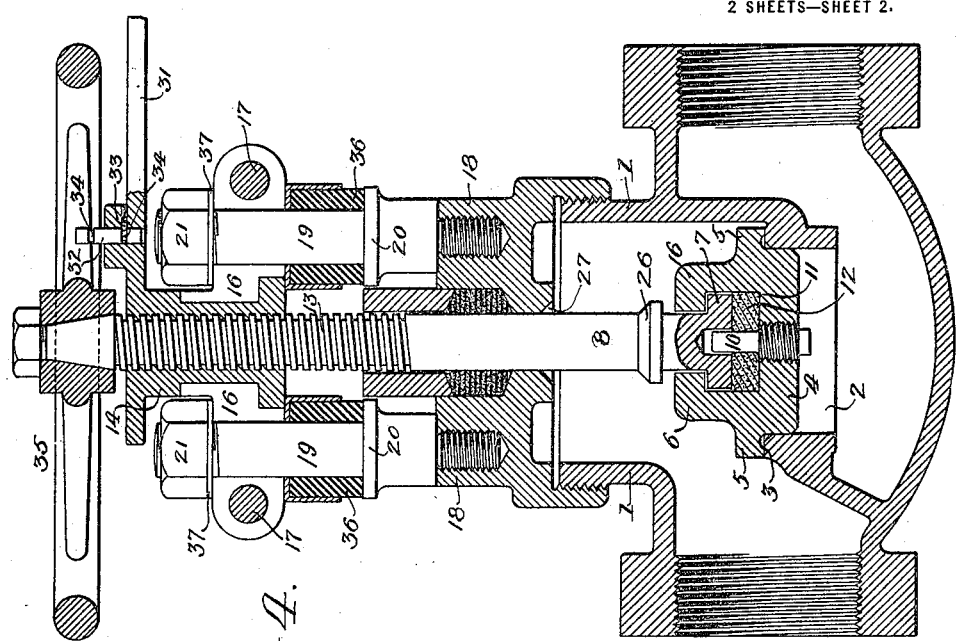
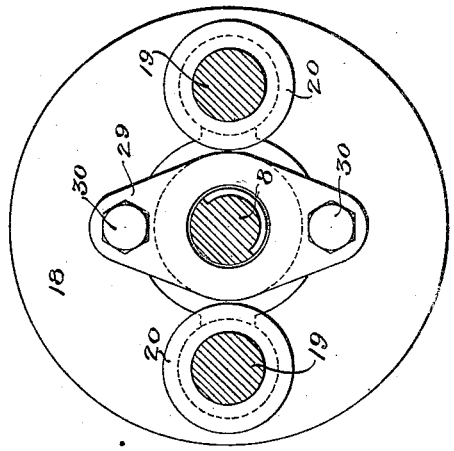
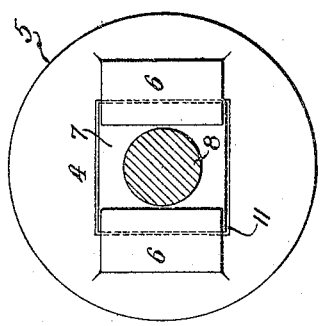

PHILIP ECKENROTH, OF PHILADELPHIA, PENNSYLVANIA.

VALVE.

1,232,461. Specification of Letters Patent. Patented July 3, 1917.

Application filed August 18, 1915. Serial No. 46,194.

*To all whom it may concern:*

Be it known that I, PHILIP ECKENROTH, a citizen of the United States, residing in Philadelphia, Pennsylvania, have invented certain Improvements in Valves, of which the following is a specification.

My invention relates to valves of the type set forth in my application for patent Serial No. 869,301 filed October 29, 1914, and the object of my present invention is to provide means that will facilitate the seating of the valve whereby a fluid-tight joint may be maintained, as well as insuring a fluid-tight joint of the stem when the valve is raised from its seat for the purpose of packing the stem. A further object of my invention is to provide means that will readily permit grinding of the valve seat by the valve to insure a proper seating thereof.

These and other features of my invention will be more fully described hereinafter, reference being had to the accompanying drawings, in which:

Figure 1 is a sectional view of my improved valve structure;

Fig. 2, is a sectional plan view on the line II—II, Fig. 1;

Fig. 3, is a sectional view on the line III—III, Fig. 1, and

Fig. 4 is a sectional view similar to Fig. 1, illustrating a modified construction.

In the drawings, 1 represents the usual casing or body having a passage 2 with an annular seat 3 surrounding the same; a valve 4 being provided having a central depending portion which may fit the inner wall of the opening or passage 2, and an outwardly extending flange 5 for engagement with the seat 3. The valve is provided with a pair of upwardly extending lugs 6 adapted to engage the head 7 of the valve stem 8, which is laterally slidable with respect to said valve when assembling the parts, and said stem is provided with a socket 9 whereby it may be retained in place by a screw plug 10 passing through the lower wall of the valve.

The valve is also socketed at 11 for the reception of a pad or washer 12 of suitable material against which the head of the stem will be pressed when said stem is turned to move the valve to its seat. The stem is threaded at 13, and adapted to the threaded portion is the usual nut 14 carried by and journaled in a split member or bearing 16, the sections of which are connected together by bolts 17.

The valve body receives a bonnet 18 carrying a pair of stud bolts 19 tapped into the same; said stud bolts having shoulders 20 and carrying nuts 21. These bolts are embraced by the split member 16 and carry springs 24 and 25; the springs 24 being disposed below the split member 16, and the springs 25 above the same, so that the nut is provided with yielding or elastic resistance when the valve stem is moved in either direction, as when seating the valve against the seat 3 in closing the valve or grinding the same, or when seating the collar 26 against the seat 27 which may also be ground, when raising the valve stem to permit renewal or adjustment of the packing 28. This packing may be held in place by a gland 29, carried by stud bolts 30, shown in Fig. 2.

Carried by the upper part of nut 14 is a handle or lever 31, whereby additional pressure may be imparted to the valve when seated. It is preferably desirable to limit the amount of this pressure, and for this purpose the handle or lever has an adjustable pin 32 which may be held in two positions by a spring bolt 33 engaging grooves 34 therein. When lowered the pin comes in contact with one of the nuts 21 so that the valve stem 8 may be turned without turning the nut, and then by giving the handle a turn within its range, the nut may be turned to further press the valve to its seat. When the pin is raised it is in position for engagement with one of the spokes of the hand wheel 35 carried by the valve stem and employed to turn the same, and when the valve 4 is seated and the hand wheel 35 and lever 31 are coupled, as by engagement of the pin 32, movement of the hand wheel will turn the stem and nut 14 and the valve on its seat; cleaning said seat from any and all deposits and grinding the valve true.

In the form of structure shown in Fig. 4, any excess pressure imparted to the stem 8 to seat the valve 4 will react upon the pad or cushion 12 and insure a positive and proper seating, while movement in the opposite direction to seat the collar 26 against the seat 27 will react upon the cushion pads 36 employed between the split member 16 and the shoulders 20 of the stud bolts 19, in lieu of the springs; insuring a proper seating and fluid-tight joints. In this arrangement it is unnecessary to employ springs or any other cushioning means above the split member 16; the nuts 21 directly engaging the same or with interposed washers 37.

I claim:

1. In a valve structure, the combination of a casing having a seat, a valve disk for engagement therewith, a threaded stem carrying said valve disk, a nut for said valve stem, means for turning said stem, and means for connecting said stem turning means and nut whereby nut and stem may be turned together.

2. In a valve structure, the combination of a casing having a seat, a valve disk for engagement with said seat, a threaded stem carrying said valve disk, a nut for said valve stem, means carried by the valve casing in which said nut is journaled, means for turning said nut, means for turning said stem, and means for connecting said stem and nut turning means whereby nut and stem may be turned together.

3. In a valve structure, the combination of a casing having a seat, a valve disk for engagement therewith, a threaded stem carrying said valve disk, a nut for said valve stem, resilient supporting means for said nut, means for turning said stem, and means for connecting said stem turning means and nut whereby nut and stem may be turned together.

4. In a valve structure, the combination of a casing having a seat, a valve disk for engagement therewith, a threaded stem carrying said valve disk, a nut for said valve stem, a bearing in which said nut may turn, resilient supporting means for said bearing, means for turning said stem, and means for connecting said stem turning means and nut whereby nut and stem may be turned together.

5. The combination, in a valve structure, of a casing, a bonnet therefor, a valve seat in said casing, a valve disk adapted to said seat, a threaded stem for said valve passing through said bonnet, a nut through which the valve stem passes, a split bearing supporting said nut, stud bolts carried by the bonnet and passing through said bearing, nuts carried by the ends of said stud bolts, nuts securing the split bearing to the stud bolts, and resilient means carried by said stud bolts above and below the bearing.

6. The combination, in a valve structure, of a casing having a valve seat, a valve disk, a threaded stem carrying said valve disk, a split bearing, a nut to which the valve stem is adapted embraced by the sections of said bearing, stud bolts passing through said bearing, nuts carried by the ends of the said stud bolts, springs carried by said stud bolts above and below the bearing, and bolts securing the bearing sections together.

7. The combination, in a valve structure, of a casing having a valve seat, a valve disk adapted to said seat, a threaded stem carrying said valve disk, a nut to which the threaded portion of said stem is adapted, a support for said nut, a lever carried by the nut, a hand wheel for turning the valve stem, and an adjustable pin carried by said lever with means to hold it in adjusted positions, said pin serving to limit rotation of the nut when in one position and to couple the nut and hand wheel so as to turn together when in another position.

8. In a valve structure, the combination of a casing having a seat, a valve disk for engagement therewith, a threaded stem carrying said valve disk, a nut for said valve stem, means for turning said stem, a yoke member supporting said nut, and resilient supports for said yoke whereby it may have limited movement with said nut in both directions.

9. In a valve structure, the combination of a casing having a seat, a valve disk for engagement with said seat, a threaded stem carrying said valve disk, a nut for said valve stem, resiliently supported movable means in which said nut is journaled, means for turning said nut, means for turning said stem, means for connecting said stem and nut turning means whereby nut and stem may be turned together, and means for limiting the vertical movement of the nut support.

10. In a valve structure, the combination of a casing having a seat, a valve disk for engagement with said seat, a threaded stem carrying said valve disk, a nut for said valve stem, a vertically movable yoke member in which said nut is journaled, springs resiliently supporting said yoke member against undue movement in both directions, means for turning said nut, means for turning said stem, and means for connecting said stem and nut turning means whereby nut and stem may be turned together.

11. In a valve structure, the combination of a casing having a seat, a valve disk for engagement therewith, a threaded stem carrying said valve disk, a nut for said valve stem, a yoke member in which said nut is mounted, resilient supporting means for said yoke member, means for turning said stem, a lever for turning the nut, and an adjustable pin for connecting said stem turning means and lever whereby nut and stem may be turned together.

12. In a valve structure, the combination of a casing having a seat, a valve disk for engagement therewith, a threaded stem carrying said valve disk, a nut for said valve stem, a yoke member in which said nut may turn, studs carried by the valve casing on which said yoke member is mounted, springs carried by said studs above and below said yoke member, means for turning said stem, a lever for turning the nut, means for limiting the compression of the springs, and means for connecting said stem turning means and lever whereby nut and stem may be turned together.

PHILIP ECKENROTH.

Copies of this patent may be obtained for five cents each, by addressing the "Commissioner of Patents, Washington, D. C."